US007204931B2

(12) United States Patent
Martin et al.

(10) Patent No.: US 7,204,931 B2
(45) Date of Patent: Apr. 17, 2007

(54) STABLE COMPOSITION WITH ENHANCED BIOCIDAL AND VIRUCIDAL EFFECT

(75) Inventors: Perry L. Martin, Yuba City, CA (US); Roy W. Martin, Downers Grove, IL (US)

(73) Assignee: Truox, Inc., McClellan, CA (US)

( * ) Notice: Subject to any disclaimer, the term of this patent is extended or adjusted under 35 U.S.C. 154(b) by 81 days.

(21) Appl. No.: 11/182,154

(22) Filed: Jul. 15, 2005

(65) Prior Publication Data

US 2006/0014659 A1 Jan. 19, 2006

Related U.S. Application Data

(60) Provisional application No. 60/588,441, filed on Jul. 16, 2004.

(51) Int. Cl.
*C02F 1/76* (2006.01)
*C11D 3/395* (2006.01)

(52) U.S. Cl. ...................... 210/755; 210/753; 210/754; 210/756; 210/758; 210/759; 510/367; 510/372; 510/375; 510/379; 510/380; 510/381; 510/382

(58) Field of Classification Search ................ 210/753, 210/754, 755, 756, 758, 759; 510/382, 367, 510/372, 375, 379, 380, 381
See application file for complete search history.

(56) References Cited

U.S. PATENT DOCUMENTS

| | | | | |
|---|---|---|---|---|
| 2,438,781 | A | 3/1948 | Kamlet | 23/86 |
| 3,170,883 | A | 2/1965 | Owen et al. | 252/187 |
| 3,177,111 | A | 4/1965 | Larsen | 162/73 |
| 3,328,294 | A | 6/1967 | Self et al. | 210/62 |
| 3,749,672 | A | 7/1973 | Golton et al. | 252/95 |
| 3,767,586 | A | 10/1973 | Rutkiewic | 252/187 |
| 4,822,512 | A | 4/1989 | Auchincloss | 252/106 |
| 5,565,109 | A | 10/1996 | Sweeny | 210/755 |
| 6,471,974 | B1 | 10/2002 | Rees et al. | 424/405 |
| 2005/0155936 | A1* | 7/2005 | Martin et al. | 210/754 |

FOREIGN PATENT DOCUMENTS

JP 09227515 9/1997

* cited by examiner

*Primary Examiner*—Charles Boyer
(74) *Attorney, Agent, or Firm*—DLA Piper US LLP

(57) ABSTRACT

A storable, stable composition that provides the effective antimicrobial benefits of halogenated agents is presented. The invention includes a water-soluble biocidal composition. The composition includes: about 0.01 to about 10 wt. % of a water-soluble inorganic halide; about 5 to about 60 wt. % of an oxidizing agent which, in aqueous solution, reacts with the inorganic halide to generate hypohalite ions; about 1 to about 15 wt. % of N-succinimide; and about 1 to about 30 wt. % of a pH buffering agent. The invention also includes a method of producing the above composition.

28 Claims, No Drawings

STABLE COMPOSITION WITH ENHANCED BIOCIDAL AND VIRUCIDAL EFFECT

RELATED APPLICATION

This application claims the benefit, under 35 U.S.C. §119(e), of U.S. Provisional Application Ser. No. 60/588,441 filed on Jul. 16, 2004, the content of which is incorporated by reference herein in its entirety.

BACKGROUND

Hypochlorite and hypochlorous acid solutions are known to be highly effective antimicrobial agents. However, their potential as antimicrobial agents have been under-exploited because their highly reactive, chemically aggressive, and unstable nature makes them difficult to use. For example, hypochlorite and hypochlorous acid solutions are generally not suitable as ingredients in antimicrobial cleaning solutions because of their reactive and unstable nature. Consequently, efforts have been made to develop more stable and user-friendly forms of hypochlorite and hypochlorous acid solutions.

Sometimes, hypochlorite and hypochlorous acid solutions are stabilized by the generation of various N-chloro compounds by reaction of hypochlorite sources with various amines and amides.

For example, a process for stabilizing alkali-metal hypochlorite solutions by using benzene sulfonamide, benzene N-sodium sulfonamide, or p-toluene sulfonamide as the stabilizing agent is known. Aqueous stabilized hypochlorite solutions, such as N-chlorosulfamate solutions, are also known. More specifically, stabilization of chlorine solutions (e.g., yielding the hypochlorite ion) with the sulfamate ion in concentrations as low as 0.4 ppm with total available chlorine sufficient to give free available chlorine in a lethal range of at least 0.2 ppm is known. The resulting stabilized chlorine solution may be used in cooling towers.

It is also known to bleach cellulose materials, particularly wood pulps, with an agent such as N-chlorosulfamic acid and N,N-dichlorosulfamic acid derived from an inorganic hypochlorite and sulfamic acid. The use of sulfamic acid with hypochlorite is said to reduce the amount of hypochlorite required to attain a predetermined level of bleaching by 40–80% of that otherwise required. It also allows the bleaching operation to be carried out at a pH substantially lower than normal and yields a pulp of materially higher viscosity and strength.

It is also known to make stable aqueous solutions of N-halo compounds in which the N-halo compounds are formed by mixing an N-hydrogen compound (e.g., sulfamic acid, sulfamide, dimethylhydantoin) with NaOCl or NaBr. The aqueous system is stabilized by including a buffer that maintains the pH of the system between 4 and 11. A similar process of preparing stable solutions of N-halo compounds entails reacting an N-hydrogen compound, e.g. sulfamic acid, in the presence of hydroxides.

Stabilized hypochlorite solutions such as N-chlorosulfamate solutions are also known to possess antimicrobial activity.

N-chlorosulfamate solutions, however, have not been considered highly desirable as biocidal or disinfecting agents in applications that involve human contact, for example, in swimming pools. Disinfecting a swimming pool requires rapid microbial elimination, which is usually not performed by N-chlorosulfamate because N-chlorosulfamate has a weak antimicrobial activity relative to other hypochlorite-containing compounds such as NaOCl, HOCl, chlorinated isocyanuric acids (e.g., trichloroisocyanuric acid and sodium dichloroisocyanurate), and chlorinated hydantoins (e.g., 1,3-dichloro-5,5-dimethylhydantoin).

Certain N-hydrogen compounds (e.g., dimethylhydantoin, methylhydantoin, cyanuric acid, succinimide, and glycoluril) and their chlorinated derivatives can dramatically improve the bactericidal efficacy of hypochlorite solutions in pulp slurries, presumably by increasing the lifespan of the active chlorine. According to some sources, the addition of dimethylhydantoin to sodium hypochlorite solutions enhances the biocidal activity of sodium hypochlorite, and the activity of hydantoins is greater than that of sulfamic acid and similar to cyanuric acid.

One or more organic dopant(s) may be added to a solution of N-chlorosulfamate to improve the antimicrobial efficacy of the solution. The organic dopants include 5,5-dialkyl hydantoins, arylsulfonamides, and succinimides.

A stabilized N-chlorosulfamate may be produced from a composition containing a peroxygen compound and a halogen source such as NaCl and N-sulfamate. It is also known to react chlorine gas with a solution containing N-succinimide to produce a high purity N-chlorosuccinimide for germicidal or chemical reaction applications.

Succinimide, isocyanurate, and hydantoins are effective stabilizers of halogens like chlorine and bromine. However, the halogenated versions of these compounds are susceptible to increased decomposition when combined with other agents such as surfactants, oxidizers, alkalis, dispersants and the like. Therefore, their shelf life is limited, and in cases where contaminants contact these agents, there is even a risk of rapid decomposition and fire.

A storable, stable composition that provides the effective antimicrobial benefits of the halogenated agents is desired.

SUMMARY OF THE INVENTION

In one aspect, the invention is a water-soluble biocidal composition. The composition includes: about 0.01 to about 10 wt. % of a water-soluble inorganic halide; about 5 to about 60 wt. % of an oxidizing agent which, in aqueous solution, reacts with the inorganic halide to generate hypohalite ions; about 1 to about 15 wt. % of N-succinimide; and about 1 to about 30 wt. % of a pH buffering agent.

In another aspect, the invention is a method of preparing a biocidal composition by providing a water-soluble inorganic halide; providing an oxidizing agent which, in aqueous solution, reacts with the inorganic halide to generate hypohalite ions; providing N-succinimide; providing a pH buffering agent; and producing a mixture by mixing the inorganic halide, the oxidizing agent, the N-succinimide, and the pH buffering agent such that the mixture is about 0.01 to about 10 wt. % inorganic halide, about 5 to about 60 wt. % oxidizing agent, about 1 to about 15 wt. % N-succinimide, and about 1 to about 30 wt. % pH buffering agent.

DESCRIPTION OF THE EMBODIMENT(S)

The antimicrobial efficacy of halogenated N-hydrogen donors such as N-succinimide, cyanurate (e.g., isocyanurate), and 5,5-alkylhydantoin is well established. For example, N-halosuccinimide has been widely used in research for selective cleavage of tryptophanyl peptide bonds, which are found in the DNAs of living organisms. Thus, it is desirable to produce a stable solution of halogenated N-hydrogen donors for use in antimicrobial applications. The antimicrobial efficacy demonstrated by these compounds indicate that, if these compounds can be stabilized, they are likely to make an antimicrobial agent that is at least as good as, and probably better than, stabilized hypochlorite solutions (e.g., N-chlorosulfamate). N-succinimide, cyanurate (e.g., isocyanurate), and 5,5-alkylhydantoin are some of the exemplary halogenated N-hydrogen donors that may be used for the invention.

The invention is a dry, storable, stable composition for producing an oxidizer from an N-hydrogen donor. The composition includes a halogen source, an oxidizing agent capable of converting the halogen to a hypohalite, and a pH buffer. When the composition is combined with water, the pH buffering agent sustains the pH in the resulting solution at a sufficiently low level, thus converting the hypohalite to a halogen gas and a stabilizing amount of N-hydrogen donor.

In an exemplary embodiment, the water-soluble composition includes: 0.01 to 10 wt. % water-soluble inorganic halide, 5 to 60 wt. % an oxidizing agent which, in aqueous solution, reacts with the halide to generate hypohalite ions, 1 to 15 wt. % N-hydrogen donor, and 1 to 30 wt. % pH buffering agent(s). A surfactant may optionally be added to the composition. The pH of a 1 wt. % aqueous solution made with the composition is between 1.2 to 5.5. The composition is characterized by a lack of evolution of halogen at a pH less than 3.

The composition is prepared by adding the reactants together and providing sufficient mixing as to ensure a homogeneous blend.

In yet another aspect, the invention is a method of producing a solution having antimicrobial efficacy and stability by combining the above composition(s) with water.

The mechanism behind the antimicrobial efficacy of halogenated N-hydrogen donors is not known with certainty. However, the ability of N-halosuccinimide and other halogenated N-hydrogen donors to specifically target the peptide bonds is likely to be one reason for the compounds' effectiveness as antimicrobial agents. Also, without being bound to a specific theory, the relative selectivity of reactions involving these compounds may allow more of the agent to pass through the organic-rich outer regions of the organism without being involved in agent-depleting reactions, thereby providing more agent to the DNA and increasing its destructive capacity.

The invention uses the high rate of inactivation of various organisms (e.g., microbial organisms) resulting from the increased effectiveness of the composition to cleave the vital tryptophanyl peptide bonds.

The invention includes a dry composition including a halogen source, an oxidizing agent capable of reacting with the halogen to generate a hypochlorite, and a pH buffer. The dry composition, when diluted with water to produce an aqueous solution, produces an effective biocidal and virucidal agent. The pH buffering agent sustains a relatively low pH in the resulting solution so as to convert the hypochlorite to a halogen gas and a stabilizing amount of N-hydrogen donor. Because the composition has a superior stability when dry, it is preferable not to combine the dry composition with water until the composition is ready for use.

The oxidizing agent reacts with the halogen to produce a hypohalite, such as hypochlorite. The oxidizing agent may be selected from persulfate, a monopersulfate such as potassium monopersulfate (PMPS), or peroxyphthalate. The halogen can be a chloride, bromide, fluoride, or iodide, and can come from any number of alkali metal salts such as Na, K, Mg and the like. An exemplary composition was made using PMPS as the oxidizing agent and chloride as the halogen.

The pH buffering agent used in the composition is an inert acidic system that may include a weak acid ($pK_a$ of 2 to about 7) and its conjugate base. In one embodiment, the buffering agent is selected from at least one of a group having a carbon chain from between 2–10 and with at least 2 carboxylic acid groups ($COO^-$), a metal alkali salt of phosphate, polyphosphate, and boric acid. In another embodiment, the buffering agent may include non-reducing acids such as maleic acid, succinic acid, adipic, glutaric acid, citric acid, malonic acid, and propionoic acid.

Inorganic salts such as acid phosphate salts and boric acid may be combined or used independently as the buffering agent. Addition of phosphates such as polyphosphates can further enhance the buffering effect of the composition by offsetting inconsistencies provided by dilution water such as hardness and alkalinity.

Depending on the application, other substances may be added to the antimicrobial composition of the invention. Exemplary substances that may be added a surfactant to enhance the penetration of microbial slimes and lipid membranes, a chelating agent to maintain the activity of the surfactants in hard water, a dispersant to enhance the separation of particulate matter, and an indicator dye to illustrate an activity level.

One or more surfactants may be added to the composition to enhance the cleaning and/or foaming properties of the composition. As mentioned above, a surfactant penetrates biofilms and membranes. Anionic surfactants as well as non-ionic surfactants (e.g., sodium dodecylbenzene sulfonate, polyoxyethylene glycol) may be used. Examples of anionic sulfonated or sulfated surfactants that may be used include linear alkyl benzene sulfonates, alkyl sulfates, alkyl sulfonates, alcohol ether sulfates, and the like. Non-ionic surfactants also enhance the stability of chlorine dioxide in solution, much like an increase in viscosity caused by gel-forming agents. Sodium lauryl sulfate, sodium dodecylbenzenesulfonate, secondary alkyl sulfonates, sodium lauryl ether sulfates, alcohol ethoxy carboxylates, alkyl diphenyl oxide disulfonates, and dioctyl sulfosuccinates may be used.

Forming the composition entails reacting the oxidizing agent with the halogen. When the oxidizing agent reacts with the halogen, a hypohalite is formed. The hypohalite, upon exposure to the low pH environment, forms a halogen gas. For example, PMPS reacts with NaCl in an aqueous solution to produce NaOCl. At a lower pH (<8.0), the NaOCl is converted to HOCl following the systems equilibrium. At still lower pH (<6.0), the HOCl is converted to $Cl_2$. By providing an effective amount of N-hydrogen donor such as N-succinimide, the chlorine gas reacts to produce N-chlorosuccinimide. An effective amount of N-succinimide is a molar ratio of at least 1:1 for N-succinimide to 1.0 mole $Cl_2$, and maybe as high as 5:1. The resulting solution is stable and provides a high degree of efficacy as an antimicrobial agent.

The composition may also include a hypohalite stabilizer. The hypohalite stabilizer is added at a concentration that is lower than that of the N-hydrogen donor, and functions as an intermediate source of hypohalite oxidizer to the N-hydrogen donor. Other N-hydrogen donors such as hydantoin or isocyanurate can be combined or substituted for the N-succinimide. Further, hydantoin (e.g., 5,5-alkyl hydantoin), isocyanurate or isocyanuric acid, and/or N-sulfamate and their respective halogen-stabilizing derivatives may be used in concentrations lower than that of the N-succinimide molar concentration to function as intermediates by reacting with any excess or residual free chlorine. The reaction with free chlorine may produce dichloroisocyanuric acid. The equilibrium of dichloroisocyanuric acid solutions slowly releases chlorine back to the solution as available chlorine is consumed by residual hypohalite stabilizer or N-succinimide liberated due to reaction of N-chlorosuccinimide. This invention offers a method of replenishing the source of N-chlorosuccinimide as it is consumed and/or allows for lower molar ratios of N-succinimide in the original composition. In this composition, a substoichiometric concentration of N-succinimide to $Cl_2$ may be used.

To further enhance the anti-microbial performance of the composition, a chlorite donor may be added to produce a solution containing N-halosuccinimide and chlorine dioxide. Chlorine dioxide is better-suited to penetrate bio-films than stabilized or free halogen donors.

The composition of the invention, relative to the resulting N-halo compounds, is considerably inert and safe to store and handle. However, when combined with water, the resulting reactions produce a highly active solution with a known high efficacy of antimicrobial activity.

The dry composition, because of its relatively inert nature before activation, may be combined with numerous ingredients that enhance its performance in the specific application. These ingredients include but are not limited to surfactants, dispersants, chelants, indicators to indicate activity, perfumes, and the like.

To further enhance shelf stability, the oxidizing agent may be coated with one or more of compounds such as polysaccharides, wax, fatty acids, latex, and silicates to improve its hygroscopicity and provide additional benefits to the application. Reducing the degree of moisture exposure from the environment (e.g., humidity) lengthens the composition's shelf life, activity, and ultimately its antimicrobial efficacy.

The composition may be prepared in a granular, homogeneous form. The components comprising the granule can be fed into a mixer/densifier such as those sold under the trade names "Lödige CB30" or "Lödige CB30 Recycler", a granulator such as those sold under the trade names "Shugi Granulator" and "Drais K-TTP 80". Alternatively, a spray-drying tower may be used to form a granule by passing a slurry of components through the spray drier. As yet another alternative, the components of the granule may be formed into a slurry by being mixed with a solvent and fed to a fluidized bed or moving bed drier such as those sold under the trade name "Escher Wyss."

The composition may also be prepared by coating an oxidizer component with an aqueous solution or slurry of the other components of the composition while being suspended in a fluidized drier system. The resulting composition may be either dried and removed from this stage of the process, agglomerated while in the fluidized bed drier, or removed and further mixed using equipment such as the mixer/densifier that are discussed above.

To further enhance the processing options and maintain the activity of the primary oxidizer, the oxidizer may first be coated to enhance its processing survivability. The coating may include inorganic as well as organic coatings such as alkali metal salts, polysaccharides, and the like. Whatever specific coating material is used, the coating material is sufficiently soluble when exposed to the liquid system that needs to be treated. For example, an alkali metal salt coating (e.g., magnesium carbonate) functions as anti-caking agents for PMPS and enhances the oxidizer's process survivability. However, when exposed to an acidic environment, the alkali metal salt coating rapidly dissolves, exposing the PMPS. Chitosan is another example of a coating material that improves process survivability and product hygroscopicity. Under normal storage conditions, when exposed to acidic conditions in particular organic acids, the polymer becomes very hydrophilic and rapidly dissolves to expose the PMPS. This condition can be exploited by including organic acid donors such as succinic acid into the granule composition when using chitosan-coated PMPS.

The composition of the invention may be implemented in a number of different embodiments. For example, the composition is suitable for being used in a soluble reactor of the type described in pending U.S. application Ser. Nos. 10/934,801 and 11/060,890, the contents of which are incorporated by reference herein. The composition may also be prepared by admixing the components in a powder form, then packaging the mixture. The components may be agglomerated, for example to form tablets. A gel-forming agent such as a polymer (e.g., polyacrylic acid, polyacrylamide, cellulose derivatives such as hydroxypropyl methylcellulose phthalate, and natural polymers such as xanthan gum) may be included to enhance the agglomeration if the components are agglomerated. Incorporating the gel allows for in-situ generation of the N-halosuccinimide by restricting the diffusion of the reactants in water, and increase the viscosity of the resulting solution to enhance the contact between the solution and a surface.

Implementing the composition of the invention in the form of a gel-forming agent or a soluble reactor is advantageous because it allows the formation of N-halosuccinimide under acid conditions to maximize the yield while releasing the generated agent into a bulk solution that possesses less than desirable conditions for the reaction (e.g., a higher pH).

While the foregoing has been with reference to particular embodiments of the invention, it will be appreciated by those skilled in the art that changes in this embodiment may be made without departing from the principles and spirit of the invention.

What is claimed is:

1. A water-soluble biocidal composition comprising:

about 0.01 to about 10 wt. % of a water-soluble inorganic halide;

about 5 to about 60 wt. % of an oxidizing agent which, in aqueous solution, reacts with the inorganic halide to generate hypohalite ions;

about 1 to about 15 wt. % of N-succinimide; and about 1 to about 30 wt. % of a pH buffering agent.

2. The composition of claim 1 further comprising no more than about 30 wt. % of a surfactant.

3. The composition of claim 1, wherein the composition produces a 1 wt. % aqueous solution having a pH between about 1.2 and about 5.5.

4. The composition of claim 1, wherein the composition converts the hypohalite ions to a halogen gas at a pH of about 3.

5. The composition of claim 1, wherein the pH buffering agent maintains a pH level below about 8.

6. The composition of claim 1 further comprising a gel-forming polymer.

7. The composition of claim 1 further comprising a chlorite donor.

8. The composition of claim 1, wherein the oxidizing agent is one of a persulfate, monopersulfate, and a peroxyphthalate.

9. The composition of claim 8, wherein the oxidizing agent is potassium peroxymonopersulfate.

10. The composition of claim 1 further comprising a chelating agent.

11. The composition of claim 1, wherein the composition is in a dry powder form.

12. The composition of claim 1, wherein the composition is an agglomerate.

13. The composition of claim 1, wherein the pH buffering agent is a non-reducible organic acid.

14. The composition of claim 1, wherein the pH buffering agent is one of an inorganic phosphate and borate salt.

15. The composition of claim 1, wherein the molar ratio of the N-succinimide to the inorganic halide is between about 1:1 and about 5:1.

16. The composition of claim 15, wherein the inorganic halide is $Cl_2$.

17. The composition of claim 1, wherein the oxidizing agent is coated with one of polysaccharide, wax, fatty acid, latex, and silicate.

18. The composition of claim 1, wherein the surfactant is an anionic surfactant.

19. The composition of claim 1, wherein the surfactant is a non-ionic surfactant.

20. A method of preparing a water-soluble biocidal composition, the method comprising:

providing a water-soluble inorganic halide;

providing an oxidizing agent which, in aqueous solution, reacts with the inorganic halide to generate hypohalite ions;

providing N-succinimide;

providing a pH buffering agent; and producing a mixture by mixing the inorganic halide, the oxidizing agent, the N-succinimide, and the pH buffering agent such that the mixture is about 0.01 to about 10 wt. % inorganic halide, about 5 to about 60 wt. % oxidizing agent, about 1 to about 15 wt. % N-succinimide, and about 1 to about 30 wt. % pH buffering agent.

21. The method of claim 20 further comprising adding a surfactant to the mixture in an amount that makes up no more than about 30 wt. % of the composition.

22. The method of claim 20, wherein the pH buffering agent maintains a pH level below about 8.

23. The method of claim 20 further comprising adding a gel-forming polymer to the mixture.

24. The method of claim 20 further comprising adding a chlorite donor to the mixture.

25. The method of claim 20 further comprising adding a chelating agent to the mixture.

26. The method of claim 20, wherein the mixing is done with components in a dry powder form.

27. The method of claim 20 further comprising agglomerating the mixture.

28. The method of claim 20 further comprising coating the oxidizing agent with one of polysaccharide, wax, fatty acid, latex, and silicate.

* * * * *